Patented July 28, 1953

2,647,125

UNITED STATES PATENT OFFICE 2,647,125

ACYLATED IMIDAZOLINES AND METHOD FOR PREPARING THE SAME

Lewis O. Gunderson, Park Ridge, Ill., assignor to Dearborn Chemical Company, Chicago, Ill., a corporation of Illinois No Drawing. Original application January 7, 1949, Serial No. 69,839. Divided and this application February 12, 1949, Serial No. 76,192

10 Claims. (Cl. 260—309.6)

The present invention relates to acylated imidazolines and a method for preparing the same.

The compounds, in general, may be characterized as acylated alkylene polyamine imidazolines, or substituted imidazolines.

This application is a division of my copending application, Serial No. 69,839, entitled "Method of Conditioning Water," filed January 7, 1949. The latter application is a continuation-in-part of my copending application, Serial No. 501,293, filed September 3, 1943, entitled "Composition and Method For Conditioning Water."

An object of the present invention is to provide high molecular weight imidazoline compounds.

A further object of the present invention is to provide surface-active, hydrophobic imidazoline derivatives.

Another object of the present invention is to provide imidazoline derivatives which are useful as foam inhibitors in aqueous systems.

The compounds of the present invention may be described as the reaction products occurring when a polyamine is reacted with a carboxylic compound to form an imidazoline, and the imidazoline thus produced is reacted with a carboxylic acid.

The polyamine which undergoes cyclization into the imidazoline compound may be an alkylene diamine, polyalkylene polyamine, hydroxy polyalkylene polyamine, an aryl diamine, and the like.

Specific polyamines which may be used in accordance with the present invention to produce the imidazoline compound, are the aryl polyamines such as diphenylene diamine, the alkylene diamines such as ethylene diamine, the polyalkylene polyamines such as diethylene triamine, triethylene tetramine, tetraethylene pentamine, dipropylene triamine, tripropylene tetramine, and the like. In addition, hydroxy polyalkylene polyamines such as ethanol ethylene diamine may be used.

The compounds of the present invention may be characterized by the presence of an imidazoline ring containing an acyl group on at least one of the nitrogen atoms, and may be represented as follows:

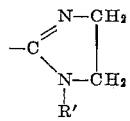

where R' is an acyl group.

The preferred compounds within the scope of the present invention are those which contain relatively long chain acyl groups attached to the imidazoline ring. Preferably, the acyl groups should contain a total of at least twelve carbon atoms in each group. The higher fatty acids, containing twelve or more carbon atoms per molecule, are especially well suited as acylating agents. Typical among these higher fatty acids are lauric, stearic, oleic, palmitic, ricinoleic, linoleic, myristic, and the like acids.

In addition to the conventional fatty acids, other acids such as those obtained from petroleum products or by organic syntheses may be used. Of special utility in this connection are the naphthenic acids recoverable in the refining of petroleum. These acids have been characterized as having a cyclopentane structure with long alkyl chains attached thereto, and usually contain one carboxyl group per molecule. The naphthenic acids have, in general, more than twelve carbon atoms per molecule and a neutralization equivalent in the range from about 225 to about 400. In using naphthenic acids in accordance with the present invention, I prefer to use those acids which have neutralization equivalents between about 250 and 320.

Acylation of the polyamines incidental to the preparation of the imidazolines may also be carried out by condensing the polyamine with a fatty glyceride, for example, tallow, coconut oil, lard oil, cottonseed oil, peanut oil, soybean oil, castor oil, whale oil, sardine oil, tall oil, and the like, which contain predominantly acyl groups having 18 carbon atoms, and some having as many as 20 carbon atoms.

The initial production of the imidazoline may be accomplished by using a carboxylic acid compound of any desired chain length. Thus, short chain acids such as acetic, butyric, caproic, and capric acid may be used as well as the previously mentioned long chain acids.

In addition, dibasic acids, such as sebacic acid, succinic acid, and adipic acid may be condensed with the polyamines to form compounds having two imidazoline rings separated by a hydrocarbon chain.

The polyamine and the carboxylic acid-furnishing compounds are reacted together at temperatures of approximately 250° to 300° C., with agitation, until the reaction product is soluble in water, indicating imidazoline formation. The imidazoline product may be crystallized from the reaction mixture and subsequently acylated with the fatty acids and the like to form the acyl derivative of the imidazoline. If desired, the acylation reaction may be carried out on the reaction product without intermediate separation, in which case the subsequent acylation step will yield a mixture of acylated imidazoline derivative and acyl derivatives of the polyamine.

The reaction products from the processes disclosed herein are mixtures of compounds difficult to separate, identify, or characterize, but are thought to comprise acylated imidazolines, acylated amines, and complexes thereof, and other cyclic compounds.

Examples of the compounds within the scope of the present invention are listed below:

In the following exemplary formulae:
Y is a carboxylic acid residue of any chain length;
R is a carboxylic acid residue containing at least 12 carbon atoms;
R' is COR or $(C_2H_4NR'')_m-C_2H_4-NHCOR$;
R'' is H or COR;
R''' is COR;
m is 0 or a whole number less than 15; and
n is a whole number greater than 1 and less than 15.

A. Acylation product of a mono-imidazoline.

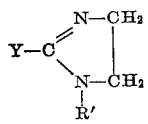

(1) 1-stearoyl, -2-stearyl imidazoline.

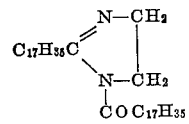

(2) 2-oleyl, -1-di-oleoyl-triethylene triamino-imidazoline.

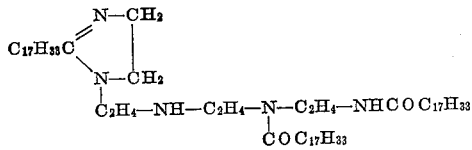

(3) 2-naphthenyl, -1-dinaphthenoyl-di-ethylene-diamine-imidazoline.

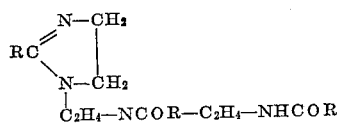

where R is a naphthenic acid residue.

(4) 2-methyl, -1-trioleoyl-triethylene triamino-imidazoline.

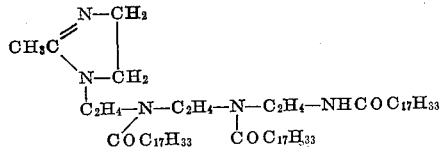

(5) 2-propyl, -1-distearoyl - diethylenediamino imidazoline.

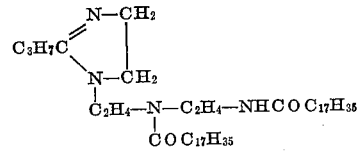

(6) 2-ampyl, -1-stearoyl imidazoline.

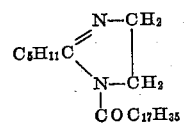

B. Acylation product of compounds having two imidazoline rings.

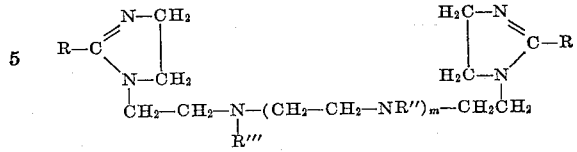

(1) N-oleoyl, di-2-stearylimidazoline of tetraethylene-pentamine.

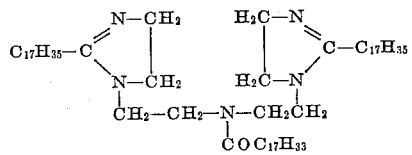

(2) N-stearoyl, di-2-stearylimidazoline of tetraethylene-pentamine.

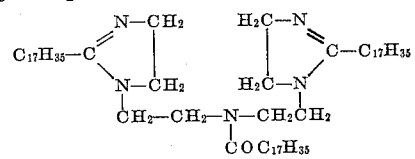

(3) N-stearoyl, -di-2-naphthenyl imidazoline tetraethylene pentamine.

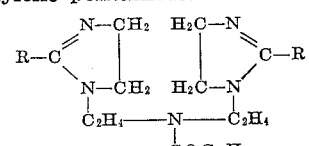

where R is a naphthenic acid residue.

C. Acylation product of dibasic acids reacted with polyamines.

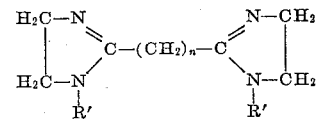

(1) Di-1-stearoyl imidazoline dimethylene.

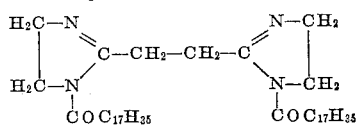

(2) Di-1-oleoylimidazoline tetramethylene.

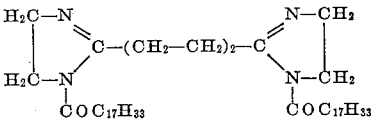

(3) Di-1-di-naphthenoyldiethylenediaminoimidazoline dimethylene.

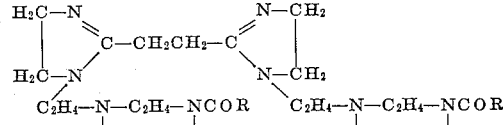

where R is a naphthenic acid residue.

(4) Di-1-naphthenoyl imidazoline octamethylene.

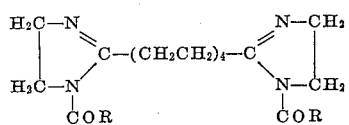

where R is a naphthenic acid residue.

Such compounds may be prepared in the manner described below:

*Example I.—1-stearoyl, 2-stearyl imidazoline*

2-stearyl imidazoline may be prepared from 55.6 grams of stearic acid (Armour "Neo-Fat" 1—60), 19.6 grams ethylenediamine hydrochloride and 9.0 grams of anhydrous ethylenediamine. The ethylenediamine hydrochloride and the stearic acid are thoroughly mixed in a 500 ml. round bottomed flask. The ethylenediamine is added slowly with agitation and the reaction mixture heated slowly to 100° C. under a reflux condenser attached to the side arm water separator. The temperature of the reaction mixture is raised slowly to 185° C. over a period of 90 minutes. A small amount of vapor begins to come over at 160° C. Between 160 and 185° C., 0.7 ml. of distillate is collected. The temperature is then raised to 250° C. over a period of 30 minutes, 2.4 ml. of distillate being collected during this interval. The temperature is raised rapidly (15 minutes) to 290° C., 3.8 ml. of distillates being collected. After further heating for 15 minutes, the product is soluble in water, giving a clear solution. The reaction mixture is dissolved in water and dilute sodium hydroxide added until no more crystals appear. The crystals of stearyl imidazoline are collected and dried in air. The product so obtained is then condensed, mole for mole, with stearoyl chloride to acylate the free amino group present.

For this purpose, the imidazoline is placed in a 200 ml. round bottomed flask and an equal weight of stearoyl chloride added slowly while agitating. Heat is evolved in the reaction. The reaction mixture is heated slowly to 100° C. Foaming occurs with the rapid evolution of hydrochloric acid. When the foaming subsides (10 to 15 minutes), the reaction mixture is heated to 160–185° C. with stirring and the temperature maintained until the evolution of hydrochloric acid ceases (approximately 4½ hours). The reaction product is twice recrystallized from benzene and acetone. The amide thus obtained (1-stearoyl, 2-stearyl imidazoline) melts at 80° to 90° C. and is soluble in benzene, alcohol and xylene, but is insoluble in acetone.

*Example II.—2-stearyl, 1-oleoyl amino ethylene imidazoline*

This is made in like manner as the preceding compound excepting that oleic acid is substituted for stearoyl chloride in the second step and diethylenetriamine is substituted for ethylenediamine.

*Example III.—Di-1-oleoyl imidazoline tetramethylene*

44 grams adipic acid, 36 grams of ethylenediamine hydrate, and 44 grams of ethylenediamine hydrochloride are gradually heated in a fractionating flask having a capacity of 300 cc. and provided with a thermometer reaching into the bottom. At about 135° C. the hydrochloride dissolves in the liquid formed. The water and the excess of ethylenediamine hydrate distill, with slight foaming. The temperature is then raised, within half an hour, to about 225° C. and this temperature is maintained for about 15 minutes. It is thereupon raised, within half an hour, to 280° C. The melt, which is light yellow, begins to darken. The reaction mixture is maintained at 290–295° C. for an additional 5–10 minutes. The dark colored melt, while hot, is stirred with about 160 grams of hot alcohol (95%) and boiled for half an hour, under reflux, until all the matter soluble in alcohol has dissolved; it is then filtered while hot, and the residue thoroughly washed two or three times, with 16 cc. of hot alcohol each time. The residue (9.5 gms.) which is insoluble in alcohol, consists for most of ethylene-diamine hydrochloride. The combined filtrates are treated with decolorizing carbon, filtered and concentrated to about 120 grams. On cooling, the whole solidifies to a crystalline mass, which is carefully filtered with suction and washed with three or four 10 cc. portions of alcohol. About 38 grams of a crystalline material moist with alcohol, probably di-imidazoline hydrochloride tetramethylene, are thus obtained.

Five grams of the di-imidazoline hydrochloride tetramethylene are dissolved with heating in 200 grams of absolute alcohol and allowed to cool completely. A solution of alcoholic KOH is slowly added, in the cold, to the solution of the di-imidazoline hydrochloride in absolute alcohol to just neutralize the hydrochloride. The KCl is precipitated. The whole is allowed to stand overnight and then filtered. The alcohol is then evaporated under reduced pressure. The yellow-white residue of di-imidazoline tetramethylene obtained is then acylated with oleic acid or oleoyl chloride in mole ratio of 1:2 similarly to the method employed in the previous example to form the di-1-oleoyl imidazoline tetramethylene.

*Example IV*

Di-1-stearoyl imidazoline dimethylene is made in the manner shown in Example III, except succinic acid is substituted for the adipic acid, and stearic acid for oleic acid. Di-1-naphthenoyl imidazoline octamethylene is made similarly, using sebacic acid and naphthenic acid.

*Example V*

Di-1-dinaphthenoyldiethylenediamine imidazoline dimethylene may be prepared as shown in Example III, except that 1 mole of succinic acid is condensed with 2 moles of triethylene tetramine to form the di-imidazoline which is further condensed with 4 moles of a naphthenic acid having a neutralization equivalent of about 300.

*Example VI*

An effective anti-foam was prepared utilizing different types of high molecular weight carboxylic acids, e. g., triethylene tetramine was reacted mole for mole with naphthenic acid having a neutralization equivalent of 300 by heating the compounds together for 6 hours at 250–275° C. until the reaction product became water soluble. The reaction product comprising imidazoline thus formed was then condensed with two moles of oleic acid to admizide the product. The crude reaction product probably comprised the compound 2, naphthenyl, 1, di-oleoyl triethylene triamino imidazoline, as well as some polynaphthenoyl, polyoleoyl amides of triethylene tetramine and other complex cyclic compounds of unknown character.

*Example VII*

One mole of myristic acid was condensed with 1 mole of diethylene triamine hydrochloride and 1 mole of diethylene triamine base, whereby the myristic acid and the amine hydrochloride were first mixed in the reactor and then slowly heated to 185° C. while the diethylene triamine base was added over a period of 2 hours. Then the temperature was increased to 250° C. in 30 minutes and to 290° C. in another 15 minutes, and kept at that temperature for another 30 minutes, after which the product was soluble in water, indicating the formation of the imidazoline.

The excess polyamine was then distilled off under vacuum, and the product was then further condensed with stearic acid at 185° C. ± 10° C. for 6 hours to produce the 2-myristyl, 1-stearoyl imidazoline amide.

Also, the method of Hill and Aspinall, J. A. C. S., vol. 61, 822 (1939), produces a suitable starting product by reacting ethylene diamine and palmitic acid mole for mole for 4 hours at 290° C. or until the reaction product is water soluble. Thereupon the excess amine is vacuum distilled and the product further condensed with palmitic acid at 185° C. ± 5° C. for 4 hours to produce a water insoluble imidazoline amide.

Example VIII

One mole of naphthenic acid (neutral equivalent 310) and 2 moles of triethylene tetramine were condensed together at a temperature of 290° C. ± 10° C. for two hours, after which the excess amine was removed by vacuum distillation. The remaining water-soluble imidazoline was then further condensed with 2 moles of the naphthenic acid (neutral equivalent of 325) for 6 hours to produce a water-insoluble crude reaction product. The reaction product is probably a mixture of amides of the 2-naphthenyl-1-diethylene diamine imidazoline.

The following examples illustrate the production of naphthenoyl amides of imidazoline in crude reaction products:

Example IX 43 grams of 70% aqueous ethylene diamine (0.5 mole) and 161 grams of naphthenic acid having an acid number of 174.3 and a neutralization equivalent of 322 were condensed at a temperature of 100° C. for a period of 90 minutes, followed by raising the temperature to 180° C. within 30 minutes, and thereupon raising the temperature to 290° C. and maintaining the latter temperature for a period of 30 minutes. The reaction product became soluble in water, indicating imidazoline formation. The reaction product was dissolved in water and diluted sodium hydroxide was added until no more crystals appeared. The crystals were then collected and dried in air. The product so obtained was condensed mole for mole with a naphthenic acid having a neutralization equivalent of 320 to acylate the free amino group by heating the reactants at a temperature of 185° C. for a period of 4½ hours.

Example X

One molecular proportion of tetraethylene pentamine was condensed with an equimolar proportion of a naphthenic acid having a neutralization equivalent of 230 by heating the mixture to a temperature of 275° C. until the reaction product became water soluble, indicating imidazoline formation. The reaction product was further condensed with 3 molecular proportions of a naphthenic acid having a neutralization equivalent of 250 at a temperature of 185° to 200° C. for 6 hours until the acid number remained substantially constant.

Example XI

One molecular proportion of tetraethylene pentamine was condensed with two molecular proportions of a naphthenic acid having a neutralization equivalent of 250 at a temperature of 250° C. for 8 hours. The water-soluble reaction product was then acylated with another molecular proportion of the naphthenic acid at a temperature of 200° C. for 6 more hours.

Similarly, triethylene tetramine may be reacted mole for mole with a naphthenic acid to form an imidazoline which is then condensed with 2 moles of a high molecular weight naphthenic acid to produce a compound which is probably 2, naphthenyl, 1, di-naphthenoyl triethylene triamine imidazoline.

As previously mentioned, the compounds of the present invention are useful as foam inhibiting agents in aqueous systems. In addition, the compounds are useful as surface-active agents in other industrial applications. Typical among such uses are those involving flotation separation of minerals and non-minerals, and the production of water repellent surfaces in the textile and ceramic industries. Another application is the production of "hydrophobic dirt" wherein the present compounds may be mixed with dirt or soil and used for surfacing material for aircraft landing strips or road surfaces for the purpose of preventing miring of vehicles. The compounds find general utility in fields where highly surface-active compounds are required.

It will, of course, be understood that various details of the process may be varied through a wide range without departing from the principles of this invention, and it is, therefore, not the purpose to limit the patent granted hereon otherwise than necessitated by the scope of the appended claims.

I claim as my invention:

1. A compound having the formula:

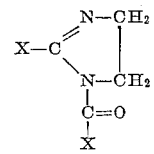

wherein X is a non-aromatic hydrocarbon radical having 11–19 carbon atoms.

2. A compound having the formula:

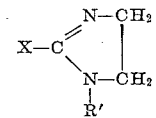

wherein X is a non-aromatic hydrocarbon radical having 11–19 carbon atoms; and R' is a radical selected from the group consisting of —CO—X and

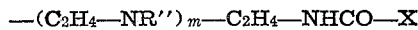

—(C₂H₄—NR'')ₘ—C₂H₄—NHCO—X wherein R'' is a radical selected from the group consisting of —H and —CO—X; and m is an integer from 0 to 15.

3. A method which comprises reacting a polyalkylene polyamine with less than an equimolecular amount of a carboxylic acid having the formula X COOH, wherein X is a non-aromatic hydrocarbon radical having 11–19 carbon atoms, at a temperature of at least 250° C. to form an intermediate product, and acylating the intermediate product with a carboxylic acid having the formula X—COOH, wherein X is a non-aromatic hydrocarbon radical having 11–19 carbon atoms.

4. 1-stearoyl, 2-stearyl imidazoline.

5. A compound having the formula:

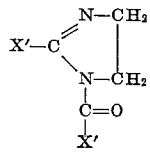

wherein X' is the hydrocarbon residue of naphthenic acid having the formula X'—COOH.

6. A method which comprises reacting a polyalkylene polyamine with less than an equimolecular amount of naphthenic acid at a temperature of at least 250° C. to form an imidazoline intermediate product, and acylating the intermediate product with a carboxylic acid having the formula X—COOH, wherein X is a non-aromatic hydrocarbon radical having 11–19 carbon atoms.

7. A method which comprises reacting a polyalkylene polyamine with less than an equimolecular amount of a carboxylic acid having the formula X COOH, wherein X is a non-aromatic hydrocarbon radical having 11–19 carbon atoms at a temperature of at least 250° C. to form an imidazoline intermediate product, and acylating the intermediate product with naphthenic acid.

8. Oleic acid amide of 2-stearyl, 1-aminoethylene imidazoline.

9. Stearic acid amide of 2-myristyl, 1-aminoethylene imidazoline.

10. Naphthenic acid diamide of 2-naphthenyl-1-diethylene diamine imidazoline.

LEWIS O. GUNDERSON.

References Cited in the file of this patent

UNITED STATES PATENTS

| Number | Name | Date |
|---|---|---|
| 2,200,815 | Ackley | May 14, 1940 |
| 2,322,201 | Jayne | June 15, 1943 |
| 2,461,730 | Gunderson | Feb. 15, 1949 |
| 2,484,146 | Barber | Oct. 11, 1949 |
| 2,568,876 | White | Sept. 25, 1951 |

FOREIGN PATENTS

| Number | Country | Date |
|---|---|---|
| 549,328 | Great Britain | Nov. 17, 1942 |